L. CAMMEN.
COOLING SYSTEM FOR INTERNAL COMBUSTION MOTORS.
APPLICATION FILED JUNE 15, 1917.
1,313,620.
Patented Aug. 19, 1919.
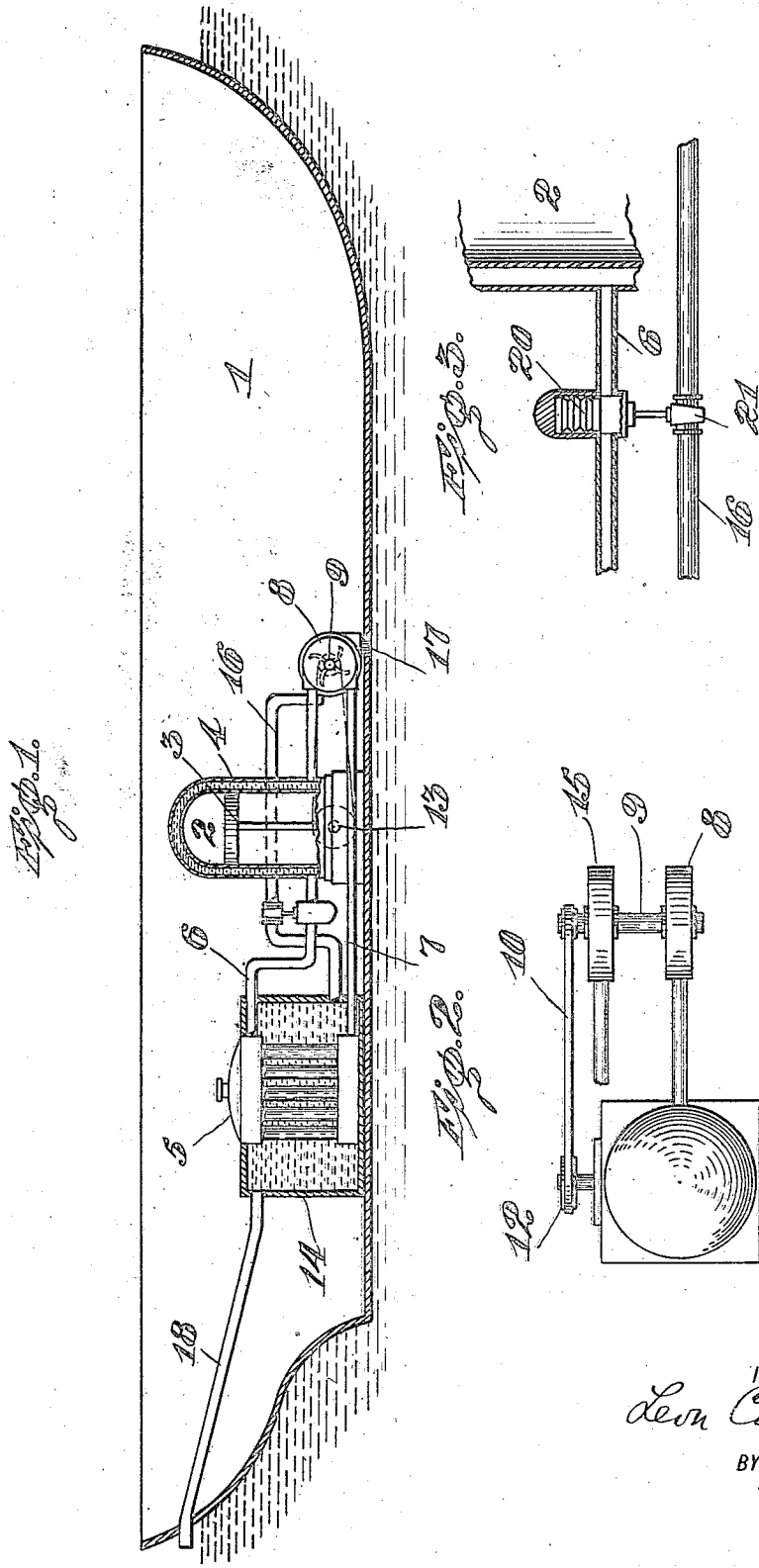
INVENTOR
Leon Cammen
BY
ATTORNEY

UNITED STATES PATENT OFFICE.

LEON CAMMEN, OF NEW YORK, N. Y.

COOLING SYSTEM FOR INTERNAL-COMBUSTION MOTORS.

1,313,620.  Specification of Letters Patent.  Patented Aug. 19, 1919.

Application filed June 15, 1917. Serial No. 174,931.

*To all whom it may concern:*

Be it known that I, LEON CAMMEN, citizen of the United States, residing at borough of Manhattan, city, county, and State of New York, have invented a new and useful Improvement in Cooling Systems for Internal-Combustion Motors, of which the following is a specification.

This invention relates to the water cooling systems of internal combustion motors and it has particular relation to such cooling means for use with motors installed in boats, because of the constant supply of water as a cooling medium.

Briefly stated, my invention consists of a closed circulatory system including the cooling jacket of a motor and radiator therefor, and a secondary water cooling system, supplying continual fresh quotas of cooling water to cool the radiator, this supply being taken from and returned to the body of water supporting the boat; and having regulating means whereby the quantity of water introduced for the purpose of cooling the radiator may be varied, to thereby serve the purpose of providing a control of thermal conditions of the engine.

In the drawing:—

Figure 1 is a side sectional elevation of a boat with a motor therein and including my improved cooling system.

Fig. 2 is an enlarged top plan view of the motor and the two pumps whereby the separate cooling units of the system are operated, and Fig. 3 is a sectional elevation showing in detail a thermostatic means for regulating the flow of water in the system.

The drawing is more or less diagrammatic to simply present the invention in an operative phase thereof without unnecessary details which are familiar in marine gas engine practice to those conversant with the art.

Thus I have indicated a form of boat or vessel at 1, having installed therein a cylinder 2, with piston 3, and water jacket 4. At 5 I have shown a conventional form of radiator having communicating and return pipes 6 and 7, with a pump 8 to cause a flow of water between the jacket 4 and radiator 5. The pump rotor is mounted on a shaft 9 which is driven by a belt or chain 10 from a pulley or sprocket 12 on the engine shaft 13.
A casing 14 incloses the radiator 5 and is supplied with a flow of water, as by pump 15, and pipe 16, the water supply being communicated to said pump, as through an orifice 17 in the boat, it being drawn from the body of water supporting the boat.

This flow of water for the casing 14 passes off therefrom, as through pipe 17, which makes its exit from the boat at a point above the water level. There is thus provided, by means of the pump 15, pipe 16, casing 14, and pipe 18, a continuous flow of water which enters the casing 14 at the temperature of the body of supporting water, and carries off through pipe 18 the heated emanations from the radiator.

It is known that in motor boat practice where there is a copious supply of cooling water for the engine jacket, this has the fault, under certain conditions, of cooling the engine to excess, thereby interfering with its efficient operation; and one of the purposes of my invention is to provide an efficient cooling system, wherein the degree of cooling may be regulated automatically, according to the engine temperatures. In other words, while the engine is starting its run, the temperature of the jacket cooling water should be at a higher degree than when the engine has been operating for a certain period during which the cooling water has become heated up to a degree of temperature beyond which it should not rise, and then it is desirable that the jacket water be subjected to a greater cooling influence.

Therefore I have provided a thermostatic controlling device 20, for controlling the flow of water through the pipe 16.

Thus, when the engine has become warmed up sufficiently to enable the temperature to operate the thermostat 20, the valve 21 will thereby be opened and permit the flow of water through pipe 16 into casing 14. We then have the radiator 5 included in the jacket cooling system and also enable the water to flow from pump 15 through the casing 14 to cool the radiator. The degree of radiator cooling which is thus effected, is also by these means automatically regulated in consonance with the requirements of the cooling service.

Variations may be resorted to within the spirit and scope of my said invention, and parts thereof used without others.

I claim:—

1. In an internal combustion engine having a cooling jacket and a radiator, means to circulate water therethrough, a radiator cooling system, means to cause a separate, continuous, non-circulatory flow of cooling water over said radiator, and means, governed by variation in temperature of the circulatory water, to regulate the volume of said continuous flow.

2. In an internal combustion engine having a cooling jacket and a radiator, means to circulate a cooling liquid therethrough, a radiator cooling system, means to cause a separate, continuous, non-circulatory flow of cooling water over said radiator, and means, governed by variation in temperature of the circulatory liquid, to regulate the volume of said continuous flow.

In testimony whereof I have signed my name to this specification, in the presence of two subscribing witnesses, this 13th day of June, 1917.

LEON CAMMEN.

Witnesses:
F. W. BARKER,
L. MOSKOWITZ.